United States Patent [19]

Spargo et al.

[11] Patent Number: 4,749,282
[45] Date of Patent: Jun. 7, 1988

[54] HYDROSTATIC SUPPORTING DEVICE

[75] Inventors: John D. Spargo; Joseph W. White, both of Annapolis, Md.

[73] Assignee: The United States of America as represented by the Secretary of the Navy, Washington, D.C.

[21] Appl. No.: 870,058

[22] Filed: May 22, 1986

[51] Int. Cl.⁴ .............................................. F16C 32/06
[52] U.S. Cl. ........................................ 384/10; 384/99; 384/124
[58] Field of Search ................... 384/99, 124, 8, 10, 384/12, 125, 221, 16, 141, 152, 303

[56] References Cited

U.S. PATENT DOCUMENTS

| 3,635,126 | 1/1972 | Engel et al. | 92/57 |
| 3,799,628 | 3/1974 | Van Gaasbeek et al. | 384/12 |
| 3,802,044 | 4/1974 | Spillmann et al. | 29/113 |
| 4,073,549 | 2/1978 | Christ et al. | |
| 4,235,482 | 11/1980 | Gibson | 384/125 |
| 4,560,213 | 12/1985 | Enderle et al. | 384/12 |

Primary Examiner—Lenard A. Footland
Attorney, Agent, or Firm—Luther A. Marsh

[57] ABSTRACT

A hydrostatic apparatus for supporting a collared shaft bearing face which axially translates creating thrust force on a button bearing face wherein the button bearing is radially supported and fluidly sealed by two separate means. This arrangement avoids sustantial non-parallelism between said shaft bearing face and said button bearing face.

6 Claims, 1 Drawing Sheet

HYDROSTATIC SUPPORTING DEVICE

BACKGROUND OF THE INVENTION

The invention generally relates to hydrostatic supporting devices, hydrostatic buttons, and in particular to hydrostatic buttons for supporting the axial thrust movement of a rotating collared shaft.

Hydrostatic buttons in various forms are already known and disclosed in U.S. Patent to: Christ et al U.S. Pat. No. 4,073,549, Engel et al U.S. Pat. No. 3,635,126, Van Gaasbet et al U.S. Pat. No. 3,799,628 and Spillman et al U.S. Pat. No. 3,802,044.

Hydrostatic buttoms comprise a top cylindrical head portion, having a bearing face operationally in supportive contact with a collared shaft bearing face, and a bottom cylindrical skirt portion. The skirt portion is provided with a circumferential groove, on its outer cylindrical surface, for receiving an elastomeric o-ring seal. The button is centrally bored along its symmetric axis and provided with an orifice therein. The button top cylindrical head portion includes a central circular recess, oriented coaxial with the button central bore, which is in fluid communication with the button central bore. Individual buttons are supported from a cooperating foundation in a cylindrical pocket therein, which pocket is fed pressurized fluid through a connecting passage in fluid communication with a pressurized fluid source. Typically a plurality of buttons are arranged in a circular array about the axis of the collared shaft. The o-ring seal prevents pressurized fluid from leaking from the pocket along the outer cylindrical surface of the skirt, thus creating a servomotor. The o-ring also provides some radial support for the button.

In operation, fluid pressure in the servomotor urges the hydrostatic button in the direction of the bearing face of the collared shaft. Pressurized fluid is bled through the button's orificed central bore to the central circular recess. Thus a hydrostatic bearing is formed capable of resisting thrust loading from a collard shaft bearing face tending to move the hydrostatic button toward the foundation pocket.

Since the collared shaft bearing face is rotating, there is some hydrodynamic bearing effect along with the hydrostatic bearing formed by the flow of pressurized fluid over the bearing face of the hydrostatic button. Rotation of the collar shaft tends to increase the flow of the pressurized fluid passing over the trailing edge of the hydrostatic button bearing face and results in a slight tip or tilt of the button.

While some tilting of the hydrostatic button is tolerable, the button must be constructed in a manner to avoid significant non-parallelism between the button bearing face and the bearing face of the shaft collar if this particular type of thrust compensation is to be effectively employed. The consequence encountered if significant non-parallelism occurs is gouges or nicks in the collared shaft bearing surface and eventual bearing failure.

To avoid significant non-parallelism some artisans have attempted to force balance the design of the hydrostatic button bearing face to avoid the adverse hydrodynamic bearing effects causing the tilting of the button. This approach results in very tight machining tolerances and significant expense, but is necessary due to the ineffectiveness of the o-ring to provide adequate radial support.

Furthermore the o-ring also tends to extrude into the circumferential groove as the button reciprocates causing a high and unconstant resistance to the button's travel.

SUMMARY OF THE INVENTION

It is therefore an object of the present invention to make an improved hydrostatic supporting device.

Another object of the present invention is to provide a hydrostatic supporting device that is relatively inexpensive to manufacture.

Yet another object of the invention is to provide a hydrostatic supporting device that avoids significant non-parallelism between the device and the member it supports.

A still further object of the present invention is to provide a more effective and efficient hydrostatic supporting device that allows for quite operation.

It is also an object of the present invention to provide a hydrostatic supporting device which offers only minimal and constant resistance to the button's travel.

A more complete appreciation of the invention and many of the attendant features thereof will be readily appreciated as the same becomes better understood by reference to the following detailed description when considered in connection with the accompanying drawings wherein:

DETAILED DESCRIPTION OF THE PREFERRED EMBODIMENT

Figure 1:
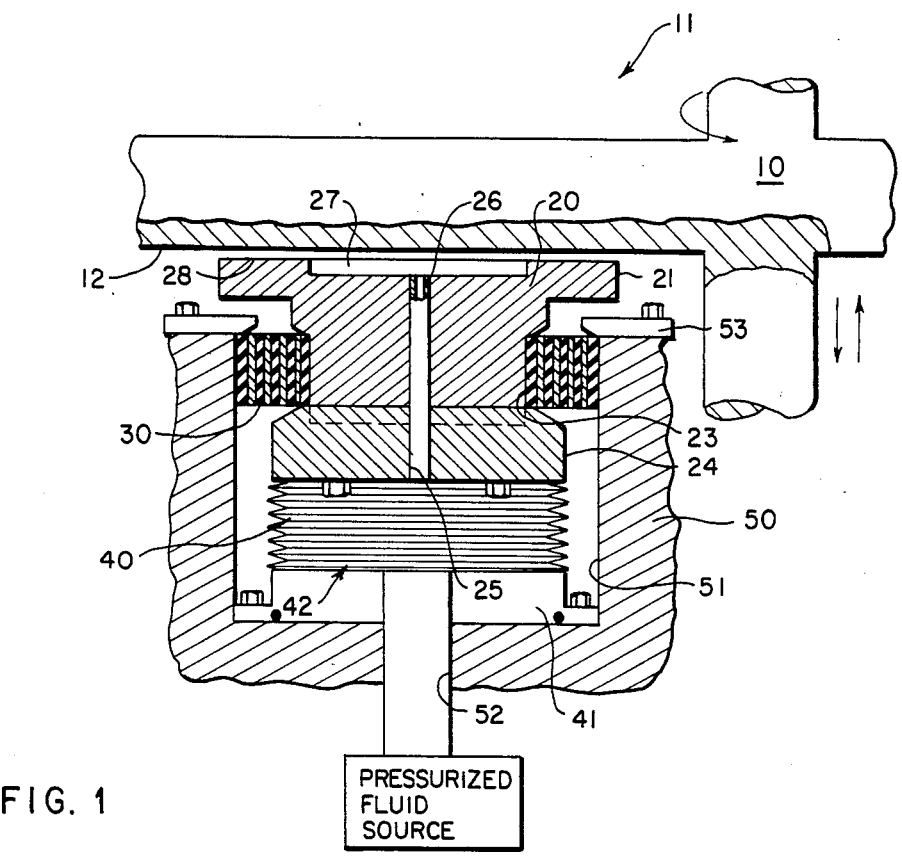
FIG. 1 is an axial sectional view of the hydrostatic supporting device of the invention supporting the collar of a rotating shaft.

Referring now to the drawings wherein like reference characters designate identical or corresponding parts throughout the several views. FIG. 1 shows collared shaft 10 rotating in the direction of rotational arrow and moving back and forth axially, along its axis of rotation 11, due to shaft thrust loading. Collared shaft 10 is provided with a bearing face 12 oriented normal to the collared shaft axis of rotation 11.

Hydrostatic button 20 comprises a top cylindrical head portion 21 with bearing face 28 and a bottom multidiametered cylindrical skirt portion which is generally hour-glass in shape; that is the skirt has a large diameter section on top, a smaller diameter section in the middle and a large diameter section on the bottom, 22, 23 and 24 respectively. The large diameter section 24 is provided with a counter bore to receive small diameter section 23, which will operate as a male coupling. The small diameter section 23 receives bearing means 30 such as an annular elastomeric laminated bearing, as will be discussed more fully hereinafter. Hydrostatic button 20 is provided with a central bore 25 which is provided with an orifice 26. The top cylindrical head portion 21 includes a central circular recess 27, oriented coaxial with and normal to central bore 25, which is in fluid communication with central bore 25.

Hydrostatic button 20 is supported from a cooperating foundation 50 in cylindrical pocket 51 therein. Fluid seal means 40, such as an annular bellows prevents pressurized fluid from a pressurized fluid source, via a connecting passage 52, from leaking into pocket 51, thus creating a servomotor 42.

The servomotor 42 operation is conventional as generally is the hydrostatic and hydrodynamic operating characteristics of the hydrostatic button 20. However, now the bearing means and fluid seal means functions are provided by separate members. Bearing means 30 provides the function of support so as to prevent substantial non-parallelism of the button 20. Fluid seal means 40 provides the function of pressurized fluid sealing so as to create a servomotor.

Bearing means 30 comprises a series of laminated coaxial cylindrical rings that are alternatively metal and elastomeric in composition. The rings of bearing means 30 are bonded to one another. The inner diameter of the inner most ring of bearing means 30 corresponds to the outer diameter of the skirt section 23. The outer diameter of the outer most ring of bearing means 30 corresponds to the inner diameter of pocket 51 of foundation 50. Ideally both the inner most and outer most rings of bearing means 30 should be elastomeric so as to avoid the translation of vibration to the foundation 50. It is readily seen that bearing means 30 moves with button 20 as the button 20 reciprocates under the effect of thrust loading.

Bearing means 30 provides a large magnitude of radial support to the button 20, while at the same time providing minimal resistance to axial moment of button 20. The radial support of bearing means 30 is substantially constant when button 20 is vertical as when button 20 is tilted, due to hydrodynamic effects, because there is no substantial extrusion of the bearing means 30 as with a conventional o-ring experiencing hydrodynamic effects. Thence resistance to axial movement of button 20 is minimal and more constant.

Bearing means 30 is slipped over small diameter section 23 of the button 20 by removal of large diameter section 24. The large diameter section 22 of the button 20 will restrain bearing means 30 on its top side and by inserting the counter bore of section 24 on the male coupling of section 23 the bearing means 30 will be restrained on its bottom side. Sections 23 and 24 can be affixed by a press fit or by fastening means, such as, for example cap screws, which are threaded into the bottom of small diameter section 23. The hydrostatic button 20 is retained in cylindrical pocket 51 by retaining means 53, such as a metal ring affixed to foundation 50.

Fluid seal means 40, such as, for example, an annular bellows 40 is utilized to create a servomotor 42 between the button 20 and the pressurized pressure source. Fluid seal means 40 is generally of, a fluid tight, cylindrical shape and allowed to operate over a wide range of axial movements of button 20 by its bellows make up. The top of the annular bellows 40 is sealedly attached to, and coaxial with, the bottom of section 24 of the button 20. The bottom of the annular bellows 40 is sealedly attached to, and coaxial with, the bottom of pocket 51 via suitable means such as, for example, centrally bored ring 41 provided with a flanged end having equispaced bores to receive cap screws, which are threaded into the bottom of pocket 51. Ring 41 has an annular groove on its bottom surface to receive an o-ring seal. The bellows could be of a metallic material, in which case attachment could be by weld, or the bellows could be plastic.

Figure 2:
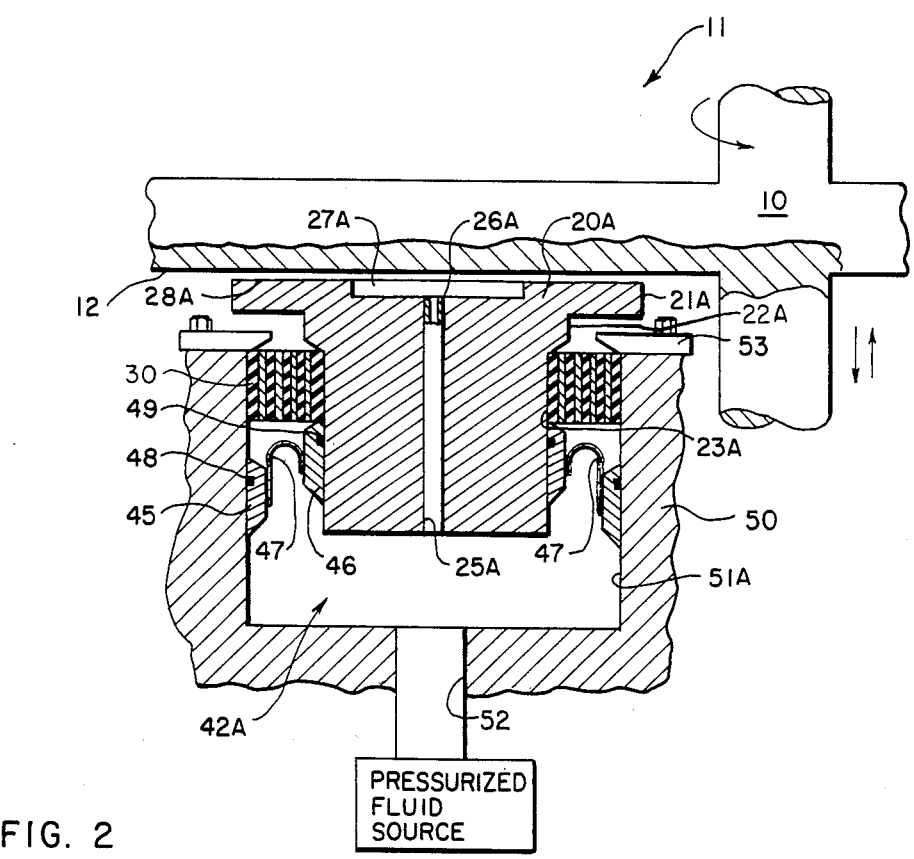
FIG. 2 is an axial sectional view of another embodiment of the hydrostatic supporting device of the invention supporting the collar of a rotating shaft.

FIG. 2 shows hydrostatic button 20A which comprises a top cylindrical head portion 21A with bearing face 28A and a multidiametered bottom cylindrical skirt portion having a large diameter section on top and a small diameter section on the bottom, 22A and 23A respectively. The small diameter section 23A receives a bearing means 30 such as the annular elastomeric bearing, supra. Hydrostatic button 20A is provided with a central bore 25A which is provided with an orifice 26A. The top cylindrical head portion 21A includes a central circular recess 27A oriented coaxial with and normal to central bore 25A, which is in fluid communication with central bore 25A.

Hydrostatic button 20A is supported from a cooperating foundation 50 in a cylindrical pocket 51A therein. Pocket 51A is fed pressurized fluid through a connecting passage 52 in fluid communication with a pressurized fluid source. Fluid seal means 45-49 such as of the rolling annular u-cup seal type prevents pressurized fluid leakage from the pocket 51A along the outer surface of the bottom cylindrical skirt sections 22A and 23A of hydrostatic button 20A, thus creating a servomotor 42A.

Annular u-cup seal 45-49 comprises two coaxial metal rings 45 and 46 each fixedly attached, i.e. by weld, to the inner circumferential surface of cylindrical pocket 51 and outer circumferential and hydrostatic button 20A respectively. Ring 45 is provided with a circumferential groove on its outer cylindrical surface to accommodate a fluid seal means 48 such as an o-ring. Ring 46 is provided with a circumferential groove on its inner cylindrical surface to accommodate a fluid seal 49 such as an o-ring. The two rings 45 and 46 are fluid sealedly connected by an annular U-cup seal 47, such as formed laminated steel welded to the rings 45 and 46 at its two extremities. The formed laminated steel is of sufficient length to allow for the reciprocal movement of hydrostatic button 20A. The u-cup seal 47 will essentially roll up and unroll as it allows for the hydrostatic button's 20A movement. The u-cup seal 47 offers sufficient flexibility and fatigue resisitance for small axial motions of approximately $1\frac{1}{8}$ of an inch.

The embodiment in FIG. 2 provides separate bearing means functions and fluid sealing means functions as was explained for in FIG. 1. Annular elastomeric bearing 30 still provides sufficient support to prevent substantial non-parallelism of the button 20A with respect to collared shaft bearing face 12. Bearing means 30 is slipped over small diameter section 23A of the button 20A. The large diameter section 22A of the button 20A will restrain bearing means 30 on its top side and by fixedly attaching metal ring 46 beneath bearing means 30, bearing means 30 will be restrained on its bottom side. The hydrostatic button is retained in pocket 51A by retaining member 53.

The second embodiment continues to allow for minimal resistance to axial movement of the button 20A due to the lack of extrusion of the bearing 30, as was experienced with a conventional o-ring bearing experiencing hydrodynamic effects.

Obviously, other embodiments and modifications of the present invention will readily come to those of ordinary skill in the art having the benefit of the teachings presented in the foregoing description and the drawings. It is therefore, to be understood that this invention is not limited thereto and that said modifications and embodiments are intended to be included within the scope of the appended claims.

What is claimed is:

1. Hydrostatic apparatus for supporting a collared shaft which moves relative to a foundation and has a bearing face, the apparatus comprising:
   a. at least one foundation pocket in fluid communication with a pressurized fluid source;

b. at least one hydrostatic button bearing, having a through bore, translationally disposed in said foundation pocket and having a bearing face, directed toward said shaft bearing face, which contains a recess in fluid communication with said bore;

c. a bearing means for radially supporting said disposed button from said foundation pocket, wherein said bearing means further comprises a series of coaxial cylindrical rings that are alternately metal and elastomeric; and, d. fluid seal means for sealedly connecting said pressurized fluid source with said button bore thus creating a servomotor for urging said button bearing face toward said shaft bearing face for supporting thrust loads on said button bearing face.

2. The apparatus as defined in claim 1 wherein said bearing means inner most and outer most coaxial rings are elastomeric.

3. The apparatus as defined in claim 1 wherein said fluid seal means comprises an annular bellows means generally cylindrical in shape.

4. Hydrostatic apparatus for supporting a collared shaft which moves relative to a foundation and has a bearing face, the apparatus comprising:

a. at least one foundation pocket in fluid communication with a pressurized fluid source;

b. at least one hydrostatic button, having a through bore, bearing translationally disposed in said foundation pocket and having a bearing face, directed toward said shaft bearing face, which contains a recess in fluid communication with said bore, c. a bearing means for radially supporting said disposed button from said foundation pocket;

d. fluid seal means for sealedly connecting said pressurized fluid source with said button bore thus creating a servomotor for urging said button bearing face toward said bearing face for supporting thrust loads on said button bearing face;

characterized in that said bearing means and said fluid seal means are separate elements.

5. The apparatus as defined in claim 4 wherein said bearing means comprises a substantially cylindrical annular elastomeric bearing for avoiding significant non-parallelism between said shaft bearing face and said button bearing face.

6. The apparatus as defined in claim 4 wherein said bearing means comprises a substantially cylindrical annular elastomeric bearing, affixedly attached to said hydrostatic button while allowing axial movement of said hydrostatic button relative to said foundation pocket, for avoiding significant non-parallelism between said shaft bearing face and said button bearing face.

* * * * *